(12) United States Patent
Braunshtein

(10) Patent No.: US 8,773,029 B2
(45) Date of Patent: Jul. 8, 2014

(54) DEVICE THAT ENABLES PLC BASED SMART DIMMERS TO FUNCTION WITH NO NEW WIRES

(75) Inventor: Danny Braunshtein, Kochav Yair (IL)

(73) Assignee: Tritonics-Technologies Ltd, Kohav Yair (IL)

(*) Notice: Subject to any disclaimer, the term of this patent is extended or adjusted under 35 U.S.C. 154(b) by 1193 days.

(21) Appl. No.: 12/516,199

(22) PCT Filed: Nov. 25, 2007

(86) PCT No.: PCT/IL2007/001449
§ 371 (c)(1),
(2), (4) Date: May 25, 2009

(87) PCT Pub. No.: WO2008/062419
PCT Pub. Date: May 29, 2008

(65) Prior Publication Data
US 2010/0019889 A1   Jan. 28, 2010

(30) Foreign Application Priority Data
Nov. 26, 2006   (IL) .......................................... 179579

(51) Int. Cl.
*H05B 37/02* (2006.01)

(52) U.S. Cl.
USPC ........................ 315/209 R; 315/291; 315/307

(58) Field of Classification Search
USPC ............. 315/194, 209 R, 219, 291, 297, 307, 315/308, 362
See application file for complete search history.

(56) References Cited

U.S. PATENT DOCUMENTS 6,750,563 B2 *   6/2004   Rostron et al. ................ 307/103

* cited by examiner

*Primary Examiner* — Jimmy Vu

(57) ABSTRACT

A device that enables "smart" dimmers comprising electronic circuits beyond those found in traditional rotary dimmers to be installed in existing houses with no need for any new electrical wires. In addition, for smart dimmers comprising PLC (power line communication) modems, the device overcomes the large attenuation imposed on power-line communication (PLC) transmissions, introduced by a lamp in series with the smart dimmer, and eliminates the large noise and ringing otherwise introduced by the switching device, inside dimmers. As opposed to prior art, that compromises either the amount of current for the electronic circuits, or the PLC attenuation or both, this disclosure overcomes both.

26 Claims, 4 Drawing Sheets

DEVICE THAT ENABLES PLC BASED SMART DIMMERS TO FUNCTION WITH NO NEW WIRES

CROSS-REFERENCE TO RELATED APPLICATIONS

This patent application is a National Stage application filed under 35 U.S.C. §371 of PCT/IL2007/001449 filed on Nov. 25, 2007, which claims priority to Israel Patent Application No. 179579 filed on Nov. 26, 2006, which are both hereby incorporated in their entirety by reference.

BACKGROUND OF THE INVENTION

1)—Fields of the Invention
(a)—Off powerline power supply, operating in series with a high resistance/impedance.
(b)—PLC transmissions at the presence of an undesirable series resistance/impedance.
(c)—Automated homes.
2)—Prior Art
The prior art in the field of automated homes, and in particular "smart-dimmers", offers one of the following solutions:
(a)—Use dedicated wires for communications and power supplies, and leave the electrical circuit of the dimmer completely independent of communication and power supply concerns. For example, the European InstaBus also known as EIB. A pair of dedicated wires is used for both DC supply and communications.
(b)—PLC based end units, such as X-Ten technology, that requires the insertion of a third wire to the smart dimmer.
(c)—U.S. Pat. Nos. 6,043,635 and 5,701,240 that suggest operating a proprietary power supply, and transmitting trough the serial impedance (lamp). The limitations of said disclosures are:
  (i)—The continuous current consumption for the electronic circuitry is limited, and requires long capacitor charging times before a PLC transmission is made possible.
  (ii)—illuminated displays and LED indicators are significantly disabled due to the limited current available.
  (iii)—Complex scenarios are either slow or impossible, due to said long capacitor re-charge times between the many transmissions associated with said scenarios.
  (iv)—Re-transmissions if required, are slow due to the long capacitor recharge times.
  (v)—A PLC signal can be severely attenuated since it is transmitted through a serial resistance of a lamp.
(d)—In order to obtain high power supply efficiency for smart dimmers that feed their internal electronics off-line, switching power supplies are traditionally used. Those normally require bulky inductors for both their operation and for filtering.
Hence making their solution less cost effective, more difficult to fit into standard dimmer wall mountings, and more difficult to comply with regulatory standard noise requirements. In addition, for smart dimmers incorporating PLC capabilities, switching power supplies introduce noise into their own PLC receivers and hence compromising their sensitivity and signal to noise ratio (SNR).

SUMMARY OF THE INVENTION

The term "smart dimmer" used henceforth, is defined as, a dimmer comprising electronic circuitry beyond that found in traditional rotary dimmers, such that said smart dimmer requires a built in power supply, to feed said electronic circuitry.

The invention comprises an off power-line power supply, and a unique device that shunts the lamp. It enables a "no new wires" solution for smart dimmers, and in particular for PLC (Power-Line Communication) based smart dimmers.

The invention provides solutions to the following three issues, with no additional wires:
(1)—Enabling high (continuous) current to feed electronic circuits inside a smart dimmer.
(2)—Enabling low attenuation of PLC signals even though a lamp is present in series with said smart dimmer, comprising PLC capabilities.
(3)—Suppressing noise and ringing introduced by a dimmer's switching device.

A unique device (100) is attached to the two wires that are otherwise, traditionally connected to a lamp.
In FIG. 1
The lamp is connected to said device, instead of directly to the traditional wires, (162), (184), even though, the smooth_fet_switch (140) is not mandatory were noise is a non-issue, and in such case the device is tied in parallel with lamp.

The device (100) comprises two switches: A lamp bypass switch (123) and a smooth_FET_switch (140). In the specific embodiment disclosed in FIG. 1, the first switch (123) is closed only at the beginning (positive portion) of each power-line sine-wave cycle, following the zero crossing.

(In other possible embodiments of the invention, said switch (123) may close at either or both the beginning of the positive and/or negative portions of the power sine-wave).

During this time the power supply that resides in the disclosed smart dimmer (200), can draw a considerable momentary current to charge a capacitor that feeds its internal circuitry. The switch (123) is in series with resistors (104), (105) and the rectifying bridge (106). The 3 elements form a low resistance bypass circuit to the lamp. Hence eliminating the limit of available supply current of the prior art.

The smooth_FET_switch (140) in series with a tuned series resonator (102), (103) assure low attenuation of transmitted and received PLC messages and efficient suppression of dimmer related switching noise and ringing. So long the FET switch (140) is closed (which is most of the time), it features a low resistance. The tuned series resonator (102), (103) also features a low impedance at the PLC carrier frequency. As a result, the PLC transmitter is coupled to the power-line through a low impedance, which assures low attenuation of PLC transmissions. Similarly, a low attenuation is also assured for PLC receptions.

The dimmer related switching device (211) causes strong interference and ringing, due to the many resonance circuits composed of: (204), (203), (201), (202), (102), (103).

To eliminate the dimmer related interference, the smooth_FET_switch (140) is employed. It is closed most of the time. It opens shortly before the dimmer related transient, stays open during the ringing process, and than gradually, reduces its resistance from infinity back to its closed state.

This gradual (smooth) switching, and the fact that it is open shortly before the anticipated dimmer related transient, assures that the harsh transients and ringings are not seen on the powerline.

During the short intervals (of few tens of micro seconds) where the smooth_FET_switch is open, PLC communication is inhibited. However this is negligible when using PLC symbols that are considerably wider than said short intervals of smooth_FET_switch openings.

DETAILED DESCRIPTION OF THE PRESENT INVENTION

A lamp unit (100), an off power-line power supply and dimmer switch controller (200), that assure availability of high current (sustained 70 mA and more) to feed the electronics, low PLC transmission attenuation, and high dimmer switching noise and ringing suppression, with no additional electrical wires.

The presence of a lamp in series with the modem (dimmer) and the powerline is challenging.

Using the prior art, the lamp greatly limits the amount of available current for the electronics.

Of course, energy can be gradually accumulated in a capacitor prior to each PLC transmission. However, this can slow down re-transmissions considerably in case of interference, and particularly when complex scenarios are desired, implying consecutive transmissions.

"Scenarios" are defined as pre-programmed sequences of PLC packets, that are intended to be transmitted one after the other in a short interval of time.

The presence of a lamp in series with the powerline poses an even greater challenge, due to introduction of PLC signal attenuation.

Few resonators (LC networks) in the dimmer's switch and lamp's vicinity are designed to overcome the attenuation problem of PLC transmissions, (as explained in the following pages).

However, those same circuits pose a serious problem of very strong ringing due to the dimmer's switching. (Dimmers in general are noise generators. Ringing introduced by the resonators aggravates the problem). Both ringing duration and ringing amplitude are aggravated.

The lamp unit (100), in conjunction with the unique power supply and component topology of the dimmer (200), provide solutions to all said problems.

Overview of the Present Invention

Figure 1:
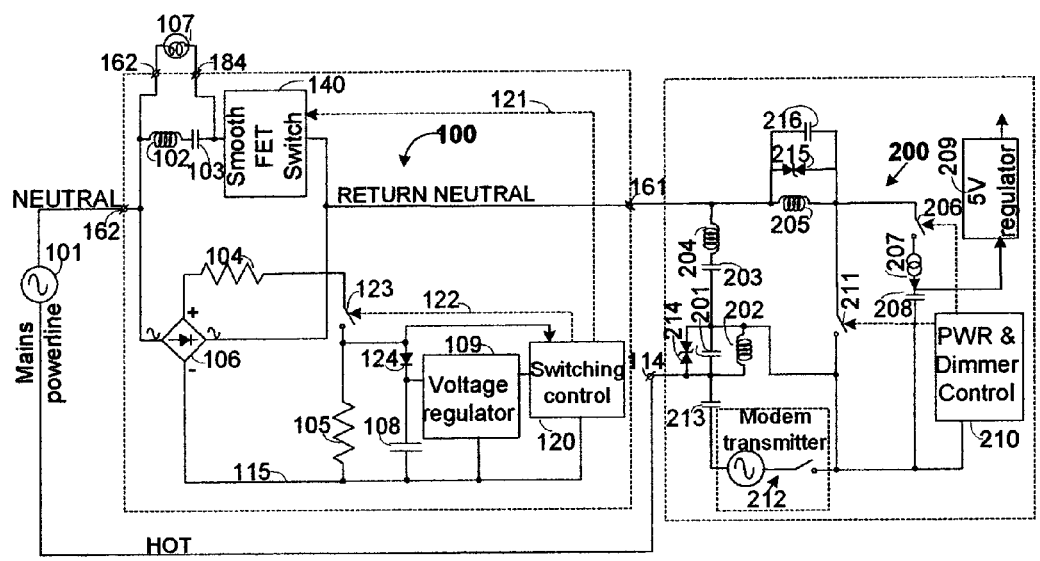
FIG. 1—Block diagram of the lamp unit (100) and the dimmer unit (200).

FIG. 1 discloses a block diagram of the invention.

Figure 2:
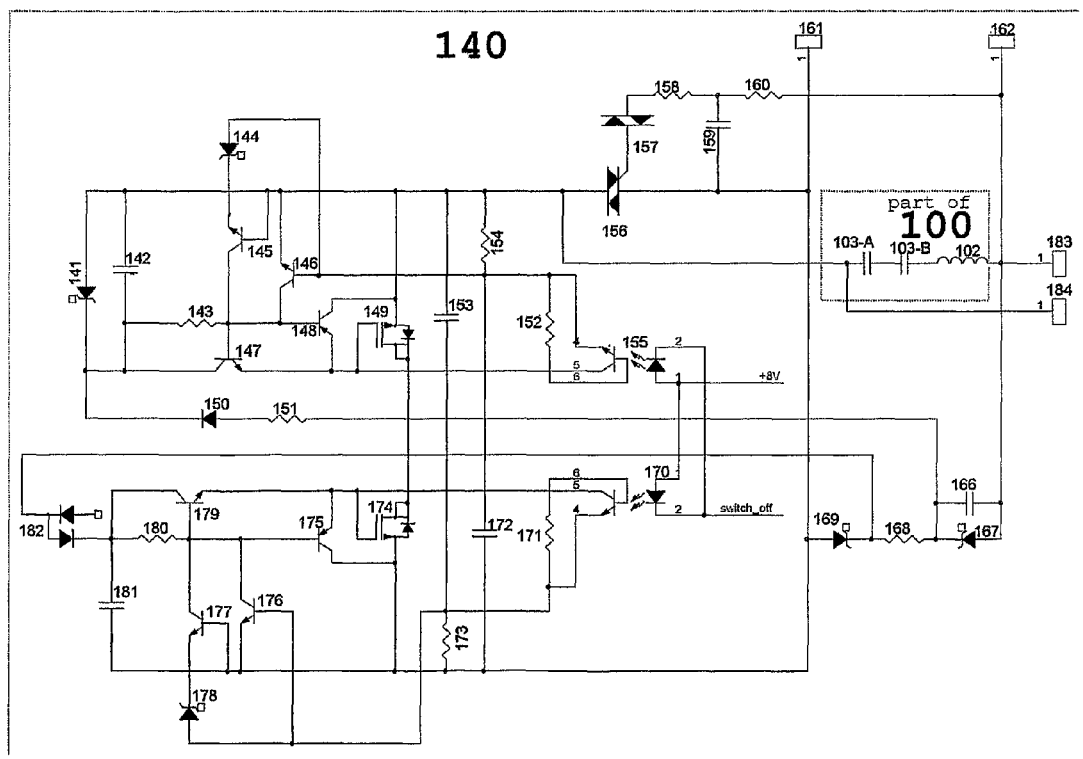
FIG. 2—Detailed schematic of smooth_FET_switch (140).

The rectifier bridge (106) and the symmetrical construct of the smooth_FET_switch (140) detailed in FIG. 2, eliminate the need to care about wire polarity during installation.

The power supply inside the dimmer unit (200) switches a controllable current source (207) on, at the beginning of each powerline cycle (rising edge). This current source charges the capacitor (208) that stores energy during the rest of the cycle. The switch (206) and the current source (207) are implemented with a high voltage FET transistor, resulting a controllable current source. The power dissipated on the FET transistor is the product of the voltage across the transistor and the current that flows through it. The accumulated charge in the capacitor (208) is a product of current and time.

Since the FET transistor acts like a current source, it is operated in its linear mode (which dissipates more heat).

Our aim is to charge that capacitor while the voltage across the FET switch is as low as possible, to reduce power dissipation. The current source assures a peak (maximum) current, during almost all the charging interval, which assures minimum power dissipation by conveying the required charge while the mains voltage is low. See FIG. 4, for the wave form description.

This unique technique, assures the availability of a relatively high current to feed the electronic circuit, while its power dissipation is only few hundred mili-Watts.

In addition, its mode of operation assures very low noise introduced on the mains, yet featuring a high efficiency. This feature eliminates the need for costly and bulky filter components usually required in traditional switching power supplies, hence enabling a small footprint required for dimmer applications, yet easily complying with low noise requirements of the regulatory standards.

The lamp unit (100) is connected between terminals (162) and (161) instead of the traditional connection to a lamp. The bridge rectifier (106) and the internal construct of the smooth_FET_switch (140), enable swapping between terminal connections (162) and (161), making installations simpler to execute.

Figure 4:
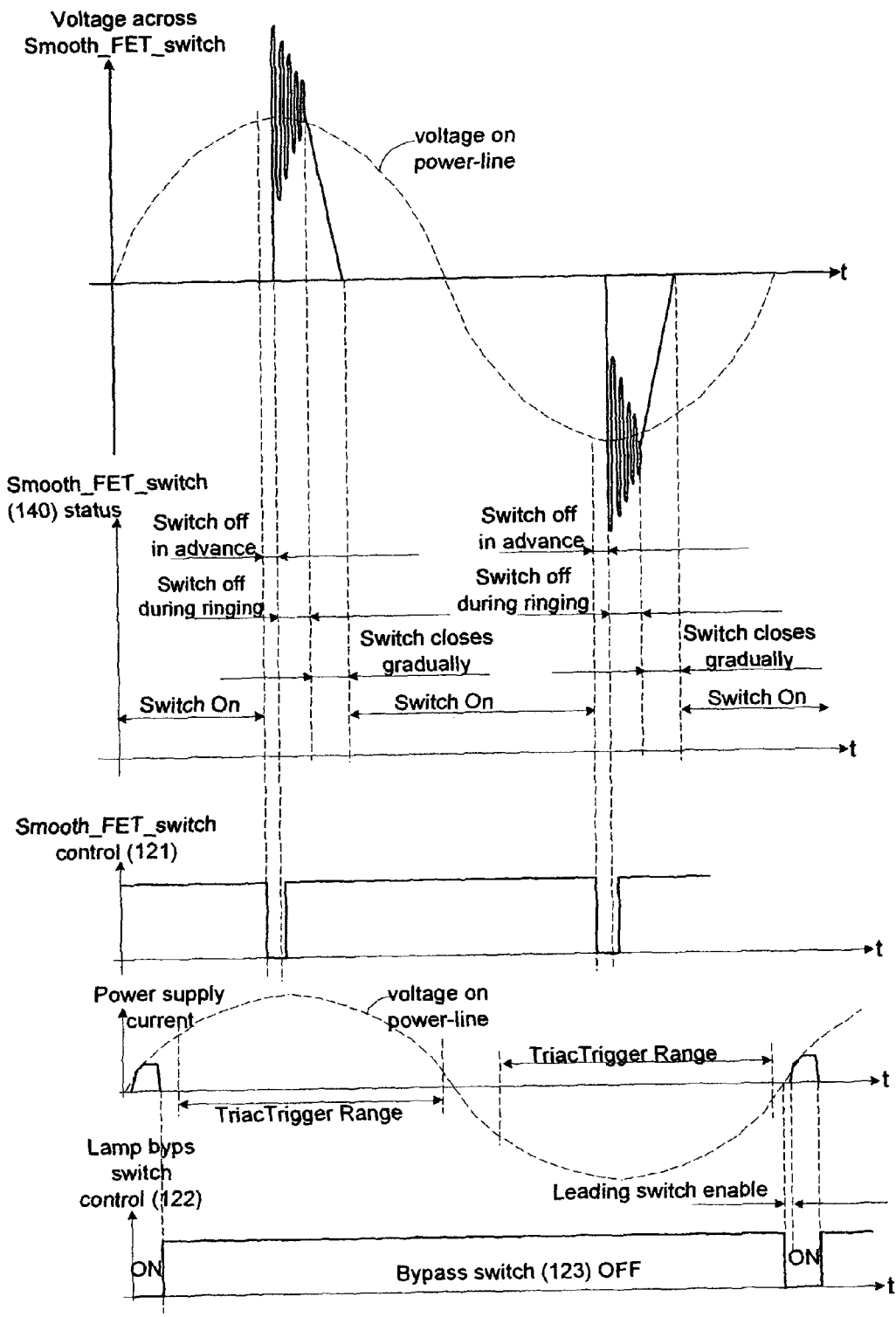
FIG. 4—Timing diagram of the bypass switch (123) and smooth_FET_switch (140).

During the current pulse interval depicted in FIG. 4, the bypass switch (123) is closed. In series with the resistors (104) and (105), it exhibits a low resistance that enables a considerable charging current (Amperes) bypassing the lamp, independent of the lamp's resistance.

The bypass switch (123) closes shortly before the charging pulse and opens immediately afterwards. The smooth_FET_switch is closed at all times except shortly before the dimmer switch (211) closes, until the ringing introduced by the dimmer switch stops. At this time the switch decreases its resistance gradually (from infinity) until it closes completely. This completely inhibits the dimmer's switching transients and associated ringing from being injected into the power-line.

The side effect of the operation of the smooth_FET_switch is that while open, it inhibits PLC data from flowing to (and from) the power-line as well.

Since these periods are short relative to a PLC symbol interval, their effect is negligible.

The Operation of the Bypass Switch and Switching Control at the Lamp Unit (100)

The main blocks in the lamp unit (100) are the bypass switch (123), the smooth_FET_switch (140) and the lamp shunt resonator composed of (102) and (103).

The bypass switch (123) allows considerable charging currents for the power supply at the dimmer unit (200).

The smooth_FET_switch inhibits injection of the dimmer's switching transitions and associated ringing to the power-line. The shunt resonator (102), (103) assures a low impedance in series with the PLC transmitter (212) and hence assures low attenuation regardless of the lamps resistance.

The switching control (120) controls both switches (123) and (140).

The switching control unit is implemented with a low cost 8 pin processor, even though other implementations are possible. The switching control unit (120) monitors the voltage across the resistor (105) and immediately opens the switch (123) if the voltage exceeds a pre-determined value. This is actually a current limit protection.

Figure 3:
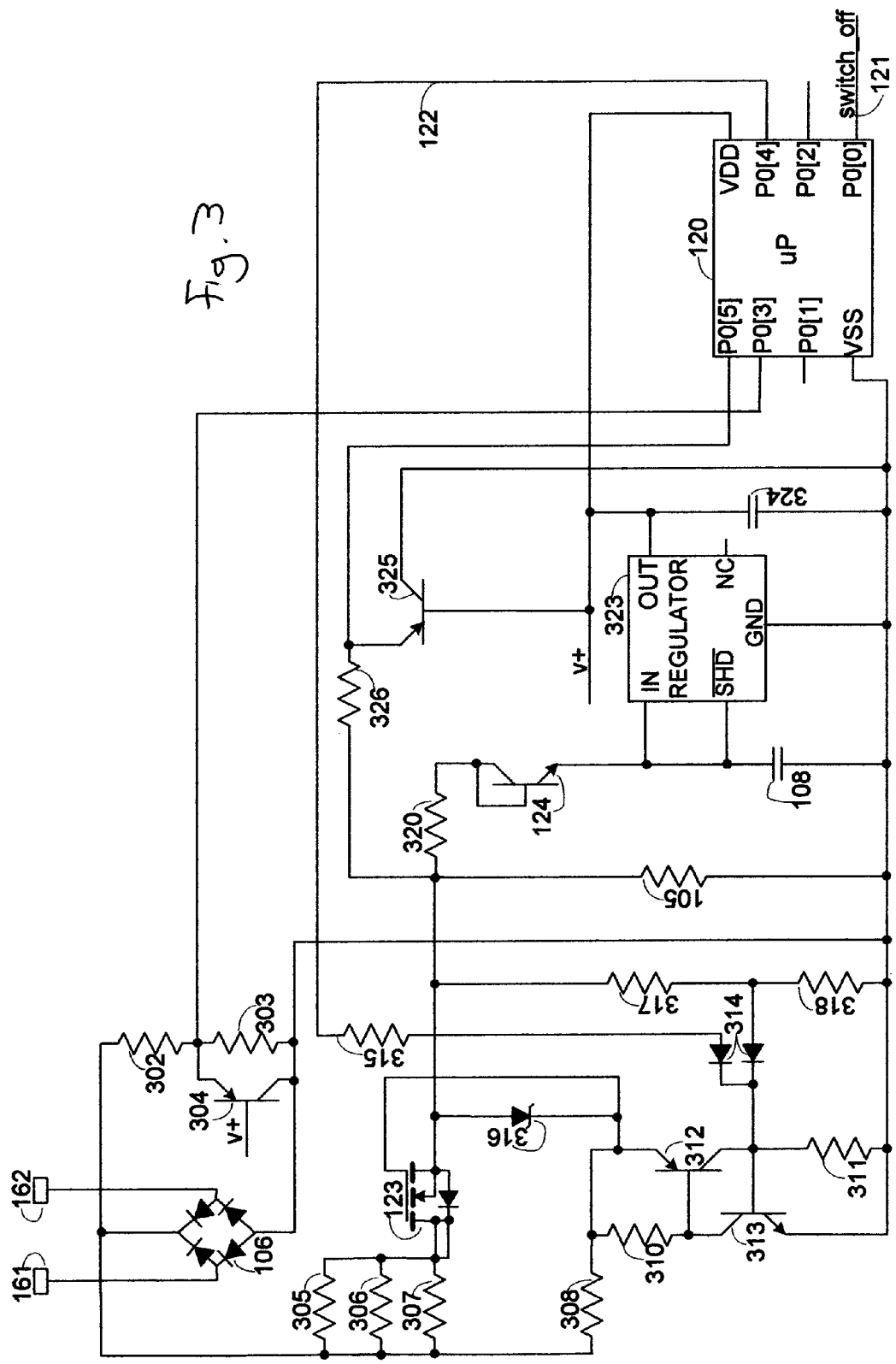
FIG. 3—Detailed schematic of the bypass switch (123) and the switching control (120).

In FIG. 3, the resistor (105) is used for both current sensing and part of the lamp unit's (100) local power supply. When the main power supply (composed of (206), (207), (208) and (209)) of FIG. 1 draws its current pulse (as depicted in FIG. 4), current flows in either direction through the bridge rectifier (106), through the FET switch (123), and through the resistors (305), (306), (307), (105), (317), (318).

The resistor (105) features a resistance of few Ohms. The voltage divider (317), (318), and the current sense resistor (105) determine the current limit. When the voltage at pin 1 of the diodes (314) reaches a level of approx. 0.8V, then the latch composed of the transistors (312) and (313) is latched and forces a low level on the gate of the FET (123). The FET in turn is cut off, and stops the flow of current. This over current protection mechanism should be rarely activated. It is most likely activated after a power interruption where the unit is not yet synchronized. During normal operation the FET switch ((123), is controlled by the processor (120).

The voltage across the resistor (105) provides information about both the momentary current and the pulse duration. The momentary current measurement as described above, serves for current limit. The pulse width information is used by the processor (120).

When the pulse width exceeds a pre-determined value, (in this embodiment some 300 uSec), it indicates that it is the power supply current generated drawn by the dimmer's power supply.

At start-up condition, where the switching control (120), is not yet synchronized, it is possible to encounter a situation were the bypass FET switch (123) is closed, while the dimmer switch is turned on. In such case said current limit protection will switch the FET (123) off. In this case, the current pulse width is much narrower, and hence identified as related to the dimmer switch, not to the power supply, at the processor (120).

The current drawn by the power supply is below, said current limit protection.

This criterion allows the processor to precisely identity the pulse related to the power supply, and synchronize accordingly.

The Processor (120) Performs the Following Tasks:

(a)—Distinguish between current pulses related to the dimmer's power supply and others.

(b)—Act like a periodic prediction unit such as a software based phase locked loop (PLL), by learning the period between power supply current pulses, averaging that period, and closing the bypass FET switch (123) periodically.

The switch (123), is closed shortly before the anticipated current pulse, and re-opened immediately after the current pulse (related to the dimmer's power supply) ends.

It stays locked on said current pulses at all times, except after power up where it is not yet locked.

(c)—Identify the leading edge of dimmer switch related pulses.

Pulses originated from the dimmer switch mixed with such that are related to the dimmer's power supply feed the processor (120) at pin 2, in FIG. 3. As said, the processor can identify the wide pulses injected to pin 1 of (120) as power supply pulses. Therefore it has no difficulty to identify dimmer switch related pulses at pin 2 of (120) by eliminating the pulses received and identified as power supply related, at pin 1 of the processor (120).

Note: The pulses related to dimmer switch operation at pin 2 of (120) can be much wider than those related to power supply operation. However dimmer switch related pulses are not seen on pin 1 of (120) unless after power up, and even then they appear as narrow pulses, since they are shortened by the current-limit circuit. Full width dimmer switch related pulses are seen only at input 2 of (120).

(d)—Measuring the time intervals between the leading edge of the power supply current pulse, (viewed as the reference point), and the leading edges of the first and second dimmer switch related pulses.

(e)—Based on said measurements, create inhibiting pulses to the smooth_FET_switch (140).

The inhibiting pulses start shortly (some 10 uSec) before the anticipated arrival of dimmer switch related pulses, and end shortly after the identification of their leading edge. (some 10 uS).

This assures that smooth_FET_switch (140) exhibits infinite resistance prior to the dimmer's switch transients.

Hardware Assisting Processor (120)

The voltage across the resistor (105) is used to create a local power supply needed to feed the processor (120). The transistor (124) acts like a rectifying diode. In series with a low resistance (320) the capacitor (108) is charged.

A voltage regulator (323) regulates the voltage feeding the processor (120). That same voltage across resistor (105) is clamped to "V+" by the transistor 325. The rest of the voltage is dropped on the resistor (326).

The clamped signal feeds pin 1 of the processor (120). Based on this signal the processor (120) acts like a pulse width discriminator that identifies the current pulses of the dimmer s power supply, and uses them as its reference pulses for said software based periodic prediction unit.

The transistor (304) in conjunction with the resistors (302), (303) clamp the voltage at the bridge rectifier output to "+V". Due the low clamping voltage relative to the high voltages dealt with, the output of this clamping circuit is equivalent to a comparator. The resulting clamped signal on pin-2 of the processor (120) is composed of both dimmer's power supply charging pulses and time intervals where current flows through the lamp. As said, the processor (120) can distinguish between the different types of pulses.

The resistors (305), (306), (307) in parallel provide the necessary voltage to feed the gate of the FET (123).

The higher voltage drop is required for the smooth_FET_switch (140) detailed in FIG. 4.

The Operation of the Smooth_FET_Switch (140) at the Lamp Unit (100)

FIG. 2 discloses a specific embodiment of the smooth_FET_switch (140).

The purpose of the FET switch is to inhibit the dimmer switch transients and associated ringing from being injected into the power-line. This is required because of 3 reasons:

(a)—The resonators composed of (102), (103), (201), (202), (203) and (204) are all tuned to the PLC carrier frequency. The voltage step introduced by switching the dimmer switch is up to 340V (in 220V networks).

The resulting ringing is large in magnitude, and tuned to the PLC carrier frequency.

Without taking care of said transients, an installation comprising many dimmers, may stop communicating, especially if each dimmer is set to a different brightness level.

(b)—The current charging the capacitor (103), (in FIG. 2 these are capacitors (103-A) and (103-B)), during a dimmer switch transient is high, and may cause damage.

c) The interference on the power-line is far beyond the acceptable levels for regulatory standards.

FIG. 2 contains a symmetrical construct of two identical circuits. The two circuits are required, since the switch must be bi-directional. At the absence of inhibiting pulses driven to the opto-couplers (155), (170), the circuit can still suppress most of said transient effect. With the inhibiting pulses, (generated by (120)) near perfect suppression is made possible.

The gates of the two FETs (149), (174) are fed from the capacitors (142), (181) respectively.

Charging of these capacitors must relay on the current pulses of the dimmer's power supply, and not on the dimmer switch (211) operation since the capacitors must be charged at all times, while the dimmer switch (211) does not always function, (for example when the light is turned off).

Furthermore: to assure simple installations without concern of polarity, the terminals (161), and (162), are allowed to be swapped when connected to the ceiling's (lamp) wires Since in this specific embodiment, the power supply current pulses appear only on the positive half of the power-line sine wave, swapping said wires, impacts a different mode of charging the capacitors, therefore the two modes must be described separately.

For the first mode of capacitor charging we assume that the current pulses flow from terminal (162) to terminal (161). In this case, whenever the voltage on terminal (162) is higher than that of terminal (161), forward current flows through zener diode (167) the resistor (151) and the diode (150) and charges the capacitor (142). The zener diode (141) limits the charged voltage to 16V.

At the same time, part of the forward current that flows through the zener diode (167), flows through the resistor (168). The zener diode (169) limits the voltage to 16V cross the diode.

This voltage serves to charge the capacitor (181) through the diode (182).

For the second mode of charging we assume that current pulses (of the power supply), flow from terminal (161) to terminal (162). (The voltage on terminal (161) is higher than the voltage on (162)), during said current pulse, charging of either (142) or (181) is impossible. However, the capacitor (166) is charged to a voltage limited by the zener diode 167.

The zener diode (169) allows forward current while zener (167) allows in this case reverse current.

The voltage across the capacitor (166) is limited to 20V. At the end of said current pulse, the voltage between terminal (161) and (162) reduces to zero. At this time, the charge of capacitor (166), flows into capacitor (142) through: resistor (151) and diode (150).

Similarly, this charge also flows through resistor (168) and diode (182) to charge capacitor (181).

This process is completed only after a few cycles, since (166) looses charge and re-gains it on the next power-line cycle.

When a large magnitude fast slew rate transient is forced by the dimmer switch (211), either of the FET transistors (149), (174) is cut off, even if an early inhibit ("switch off") signal is not asserted at the opto-couplers (155), (170).

Without compromising generality, we assume that a fast large magnitude, positive transient appears on terminal (162) relative to terminal (161). Generality is not affected, since FIG. 2 comprises two identical circuits, tied back to back. The symmetry implies just changing roles.

When the fast transient appears, (and the opto-couplers are at their off state), a relatively high current flows through the two FETS. Their total on resistance is about 1.5 Ohm, such that when the momentary current reaches 0.5 A, they drop (together) a voltage of 0.75V. At the first moment, all this voltage appears on the resistor (173). As a result, transistor (176) is switched on and the gate charge of the FET (174), is discharged through transistor 175. The FET (174) is cut off.

Strong ringing continues after the initial transient. This ringing is apparent on resistor (173) and continues to cut-off the FET (174) on each ringing cycle, until ringing ends.

The time between ringing cycles is too short for the FET (174) gate to re-charge, hence it remains cut-off during all the ringing process. When ringing stops, the FETs gate is charged through the charging accelerator-transistor (179). The FET starts conducting. As it does, the voltage between the two sources of the FET transistors (149) and (174) decreases. As a result, a negative voltage relative to the base of transistor (177) is apparent. When this voltage reaches the voltage of the zener diode (178) plus base emitter threshold of transistor (177), the transistor (177) pulls the voltage at the gate of the FET (174) down, through the transistor (175).

This forms a negative feedback that keeps the voltage on resistor (173) on a constant level, of the zener voltage plus the base emitter threshold. A constant voltage on the resistor (173), means a constant discharge current through the capacitor (153), and hence a linear reduction of the voltage across the capacitor (153). This also means a linear voltage reduction of the voltage between the sources of (149) and (174).

This is very desirable since it prevents a sharp transient on the power-line, and prevents excessive current through the capacitor (103), which is composed of (103-A) and (103-B).

Due to the assumption that the opto-couplers were not activated, a transient of at least 0.5 A is seen on the power-line. This transient is short lived (few hundred nSec) but is still undesirable.

To eliminate the transient completely, the opto-couplers turn the FETs (149, 174) off shortly before the anticipated (periodic) transient of the dimmer switch (211).

This is accomplished by the processor (120), that acts like a periodic prediction unit and can anticipate the dimmer's switch next transient.

When the opto-couplers internal LEDs are on, current flows from the FETs (174), (149) gates through the opto-couplers, to the base of (176) and (146). These in turn cut off the FETs through transistors (175) and (148). Thanks to the processor, (120), the FETs (149), (174) are cut off shortly before the dimmer's switch anticipated transients and hence their transient and ringing are not visible on the powerline.

As mentioned, the two FETs (149), (174) in series feature a 1.5 Ohm resistance. This is not negligible when the lamp is of a high wattage. For lamps of a high wattage, the optional diac triac (156), (157) are installed. To avoid excessive heat of the FETs (149), (174), the optional triac (156) is tied in parallel with the FETs. It is turned on in the traditional way with a diac, shortly after the FETs are nearly turned on completely. This allows a low resistance of the triac (156) in parallel with the relatively high on resistance of the FETs (149), (174). Due to the lower voltage drop of the triac, excessive heat is prevented.

Operation of the Dimmer's Power Supply

The dimmer's power supply is based on a switched current source charger. The prior art uses transistors in their on/off states such that they dissipate minimum power due to their low Rds-on.

This is normally done in conjunction with inductors that store energy.

In this disclosure, due to the low switching frequency of 50 Hz/60 Hz, such inductors would have been bulky and unfit to dimensions dictated by dimmer's wall mounting size's.

Another option would have been to use serial resistors while operating a FET switch in on/off mode.

This would have lead to excessive power consumption in the order of magnitude of Watts.

The disclosed power supply uses the FET transistor (206), (207) in its linear mode.

This obviously causes the transistor to dissipate more power, than it would have in switching mode.

However, it is a lot less then the dissipated power over serial resistors, otherwise required.

The method is as follows: A capacitor needs to be charged with enough charge per cycle (50 Hz). The best time to deliver this charge is when the voltage across the FET transistor (206), (207) is minimal. Current is drawn at the beginning of the 50 Hz cycle when voltage goes increasingly high. The aim is to deliver the charge before the voltage goes too high.

In other words, the peak (maximum) current is desired from the first moment when the voltage is still low.

A current source (207), in series with a switch (206), both implemented by one FET transistor, enable an efficient power supply, with no inductors. The peak current is drawn at low voltages as disclosed in FIG. 4. A power dissipation of only few hundred mili-Watts is achievable. Said power supply charges the capacitor (208). A voltage regulator (209) is used to feed the internal circuitry.

Enabling Power Supply, Dimmer Operation, and PLC Communication Through the Same Wires.

It is a great challenge to comply with the many conflicting requirements in order to allow a no-new wires PLC based, smart dimmer.

To enable power supply and dimmer operation with no interference, the dimmer switch trigger range starts after the power supply current pulse. This is depicted in FIG. 4.

The PLC transmitter is represented as an alternating (AC) voltage source (212), in parallel with a parallel resonator (201), (202). The resonator is tuned to show maximum impedance at the PLC carrier frequency, and very low impedance at 50 Hz. By doing so, the resonator enables normal operation of the dimmer and power supply since low frequency current (50 Hz) can easily flow through it.

The series resonator (203), (204) is designed to show minimum impedance at the PLC carrier frequency, and couple the right side of the PLC transmitter (212) to the return neutral line (see (100)). The dimmer switch (211) is connected in series with an inductor (205). Since the serial resonator (203), (204) is not always precisely tuned, (due to part limited accuracy) it does not always show low enough impedance.

Without inductor (205) the dimmer switch (211) would have changed the resonator's (203),(204) impedance from few ohms (when not tuned properly) to less then 1 ohm when the dimmer switch is on (in parallel).

This would have caused undesirable periodic (100/120 Hz) modulation of the PLC signal. To avoid this, the inductor (205) shows a high impedance relative to the impedance of the serial resonator (203),(204). When the dimmer switch (211) is on, inductor (205) is connected in parallel with the resonator (203),(204) and has little influence on the equivalent impedance. No significant undesirable modulation is introduced due to the dimmer switch (211) operation.

Capacitor (216) in parallel with inductor (205), can be added optionally, to form a parallel resonator that exhibits an even higher impedance than that exhibited by inductor (205) alone, and thus obtain even less undesirable modulation.

The capacitor (213) is an AC coupler that couples the PLC transmitter with the output terminal.

The dimmer switch (211) switching causes large magnitude, long time ringing. To decrease the magnitude and time of residual ringing two transient voltage suppressors (214), (215) are employed.

In receive mode, the same topology assures low attenuation of the received signal.

In this mode the modem transmitter (212), is disconnected, and the received signal is picked from the parallel resonator (201), (202).

The series resonator (203), (204) couples the power-line return neutral line to the right hand side of the parallel resonator (201), (202).

The latter exhibits a high impedance, and hence the received signal builds on it.

What is claimed is:

1. A device electrically connectable in parallel to an AC power-line load, the device comprising:
   a pair of terminals for connecting the device in parallel to the power-line load;
   an electronic bypass switch configured to shunt said power-line load;
   an excessive current protection circuit configured to open the bypass switch upon detecting excessive current flowing through said bypass switch;
   a switching control unit configured to:
      detect the width of current pulses arriving after zero-crossings of the power-line voltage flowing through said bypass switch, and to identify current pulses having a width exceeding a pre-determined value as power supply current pulses;
      close the bypass switch before or at the next power supply current pulse, to enable said power supply current pulse a current level that is not restricted by the power-line load impedance; and
      open the bypass switch after or at the end of the power supply current pulse.

2. The device according to claim 1, wherein said bypass switch further comprises:
   a diode bridge having DC ports connected to a switching element that comprises a transistor,
   the diode bridge having AC ports configured as ports of said bypass switch, thereby configuring said bypass switch to act as a bi-directional switch.

3. The device according to claim 1, wherein the switching control unit further comprises circuitry configured to anticipate the time of arrival of at least part of said power supply current pulses, selected from the group of circuits consisting of:
   a zero-crossing detection circuit configured to detect power-line voltage zero crossings, a periodic prediction unit configured to predict the arrival times of the power supply current pulses based on monitoring the arrival times history, and both; wherein said circuitry indicates to the switching control unit of times to close the bypass switch.

4. The device according to claim 2, wherein the switching control unit further comprises circuitry configured to anticipate the time of arrival of at least part of said power supply current pulses, selected from the group of circuits consisting of:
   a zero-crossing detection circuit configured to detect voltage zero crossings across the bypass switch, a periodic prediction unit configured to predict the arrival times of the power supply current pulses based on monitoring the arrival times history, and both; wherein said circuitry indicates to the switching control unit of times to close the bypass switch.

5. The device according to claim 1, further comprising a bypass resonator configured to shunt the bypass switch, the bypass resonator is tuned to exhibit minimum impedance at a frequency that is substantially the center frequency of a power-line communication signal.

6. The device according to claim 2, further comprising a bypass resonator configured to shunt the bypass switch, the bypass resonator is tuned to exhibit minimum impedance at a frequency that is substantially the center frequency of a power-line communication signal.

7. The device according to claim 3, further comprising a bypass resonator configured to shunt the bypass switch, the bypass resonator is tuned to exhibit minimum impedance at a frequency that is substantially the center frequency of a power-line communication signal.

8. The device according to claim 4, further comprising a bypass resonator configured to shunt the bypass switch, the bypass resonator is tuned to exhibit minimum impedance at a frequency that is substantially the center frequency of a power-line communication signal.

9. The device according to claim 1 further comprising a comparator configured to indicate that the absolute value of the voltage across the bypass switch is above a pre-defined threshold, wherein the switching control unit is configured to generate an enveloping signal to indicate periodically predicted enveloping time intervals around the leading edges of indications of voltage above threshold received from the comparator.

10. The device according to claim 9 further comprising a smooth-FET-switch circuit configured to open in response to said enveloping signal then gradually reduce resistance in response to the termination of said enveloping signal, thereby preventing sharp current transients through said connectable power-line load.

11. The device according claim 2, further comprising a comparator configured to indicate that the absolute value of the voltage across the bypass switch is above a pre-defined threshold, wherein the switching control unit is configured to generate an enveloping signal to indicate periodically predicted enveloping time intervals around the leading edges of indications of voltage above threshold received from the comparator.

12. The device according to claim 11 further comprising a smooth-FET-switch circuit configured to open in response to said enveloping signal then gradually reduce resistance in response to the termination of said enveloping signal, thereby preventing sharp current transients through said connectable power-line load.

13. The device according to claim 3 further comprising a comparator configured to indicate that the absolute value of the voltage across the bypass switch is above a pre-defined threshold, wherein the switching control unit is configured to generate an enveloping signal to indicate periodically predicted enveloping time intervals around the leading edges of indications of voltage above threshold received from the comparator.

14. The device according to claim 13 further comprising a smooth-FET-switch circuit configured to open in response to said enveloping signal then gradually reduce resistance in response to the termination of said enveloping signal, thereby preventing sharp current transients through said connectable power-line load.

15. The device according to claim 4, further comprising a comparator configured to indicate that the absolute value of the voltage across the bypass switch is above a pre-defined threshold, wherein the switching control unit is configured to generate an enveloping signal to indicate periodically predicted enveloping time intervals around the leading edges of indications of voltage above threshold received from the comparator.

16. The device according to claim 15 further comprising a smooth-FET-switch circuit configured to open in response to said enveloping signal then gradually reduce resistance in response to the termination of said enveloping signal, thereby preventing sharp current transients through said connectable power-line load.

17. The device according to claim 6 further comprising a comparator configured to indicate that the absolute value of the voltage across the bypass switch is above a pre-defined threshold, wherein the switching control unit is configured to generate an enveloping signal to indicate periodically predicted enveloping time intervals around the leading edges of indications of voltage above threshold received from the comparator.

18. The device according to claim 13, further comprising a bypass resonator configured to shunt the bypass switch, the bypass resonator is tuned to exhibit minimum impedance at a frequency that is substantially the center frequency of a power-line communication signal.

19. The device according to claim 5 further comprising a comparator configured to indicate that the absolute value of the voltage across the bypass switch is above a pre-defined threshold, wherein the switching control unit is configured to generate an enveloping signal to indicate periodically predicted enveloping time intervals around the leading edges of indications of voltage above threshold received from the comparator.

20. The device according to claim 19, wherein the switching control unit further comprises circuitry configured to anticipate the time of arrival of at least part of said power supply current pulses, selected from the group of circuits consisting of:
 a zero-crossing detection circuit configured to detect power-line voltage zero crossings, a periodic prediction unit configured to predict the arrival times of the power supply current pulses based on monitoring the arrival times history, and both; wherein said circuitry indicates to the switching control unit of times to close the bypass switch.

21. The device according to claim 20, wherein said bypass switch further comprises:
 a diode bridge having DC ports connected to a switching element that comprises a transistor,
 the diode bridge having AC ports configured as ports of said bypass switch, thereby configuring said bypass switch to act as a bi-directional switch.

22. The device according to claim 6, wherein the switching control unit further comprises circuitry configured to anticipate the time of arrival of at least part of said power supply current pulses, selected from the group of circuits consisting of:
 a zero-crossing detection circuit configured to detect power-line voltage zero crossings, a periodic prediction unit configured to predict the arrival times of the power supply current pulses based on monitoring the arrival times history, and both; wherein said circuitry indicates to the switching control unit of times to close the bypass switch.

23. The device according to claim 19 further comprising a smooth-FET-switch circuit configured to open in response to said enveloping signal then gradually reduce resistance in response to the termination of said enveloping signal, thereby preventing sharp current transients through said connectable power-line load.

24. The device according to claim 20 further comprising a smooth-FET-switch circuit configured to open in response to said enveloping signal then gradually reduce resistance in response to the termination of said enveloping signal, thereby preventing sharp current transients through said connectable power-line load.

25. The device according to claim 17 further comprising a smooth-FET-switch circuit configured to open in response to said enveloping signal then gradually reduce resistance in response to the termination of said enveloping signal, thereby preventing sharp current transients through said connectable power-line load.

26. The device according to claim 21 further comprising a smooth-FET-switch circuit configured to open in response to said enveloping signal then gradually reduce resistance in response to the termination of said enveloping signal, thereby preventing sharp current transients through said connectable power-line load.

* * * * *